(12) United States Patent
Lindsay

(10) Patent No.: US 7,296,778 B2
(45) Date of Patent: Nov. 20, 2007

(54) MOUNTINGS FOR PAYLOADS

(75) Inventor: Richard Arthur Lindsay, Suffolk (GB)

(73) Assignee: Vitec Group PLC, Suffolk (GB)

( * ) Notice: Subject to any disclaimer, the term of this patent is extended or adjusted under 35 U.S.C. 154(b) by 0 days.

(21) Appl. No.: 10/312,653

(22) PCT Filed: Jun. 22, 2001

(86) PCT No.: PCT/GB01/02802

§ 371 (c)(1),
(2), (4) Date: Dec. 26, 2002

(87) PCT Pub. No.: WO02/02988

PCT Pub. Date: Jan. 10, 2002

(65) Prior Publication Data
US 2004/0021044 A1    Feb. 5, 2004

(30) Foreign Application Priority Data
Jun. 29, 2000 (GB) ................................. 0016047.3

(51) Int. Cl.
*F16M 3/00* (2006.01)
(52) U.S. Cl. ................. 248/648; 248/183.3; 248/372.1
(58) Field of Classification Search ............ 248/372.1, 248/395, 397, 648, 176.3, 183.3, 185.1, 921, 248/923, 371, 587, 590, 625; 108/1, 2, 6, 108/7, 136
See application file for complete search history.

(56) References Cited

U.S. PATENT DOCUMENTS

| 2,757,712 | A | * | 8/1956 | Johnson | 248/590 |
| 3,359,927 | A | * | 12/1967 | Stanley | 108/2 |
| 3,698,327 | A | * | 10/1972 | Litvinoff et al. | 108/2 |
| 3,874,309 | A | * | 4/1975 | Cowley | 108/2 |
| 3,908,561 | A | * | 9/1975 | Cowley | 108/6 |
| 4,726,253 | A | * | 2/1988 | Russell | 74/569 |

(Continued)

FOREIGN PATENT DOCUMENTS

DE    27 17 772    10/1978

(Continued)

OTHER PUBLICATIONS

PCT International Search Report from International Application No. PCT/GB01/02802, Dated Oct. 4, 2001.

(Continued)

*Primary Examiner*—Korie Chan
(74) *Attorney, Agent, or Firm*—Patterson & Sheridan, L.L.P.

(57) ABSTRACT

The disclosure relates to a mounting for a payload (e.g. a TV/Video camera) comprising a platform (18) providing a mounting face for the payload, means (15, 19) to mount the platform for rotation about a horizontal axis for tilting of the platform to either side of a neutral position in which the platform is horizontal and spring (25) means to provide resistance to the said tilting movement in either direction from said neutral position to counterbalance the payload/platform in any position of tilt. The spring means comprise a torsion spring means and coupling means (21, 22, 24, 24) are provided interconnecting the platform and said spring means with a mechanical advantage which increases automatically with movement of the platform away from said neutral position to compensate for the increasing spring resistance to tilting generated by the torsion spring to counterbalance the camera/platform combination through its range of tilting.

16 Claims, 5 Drawing Sheets

U.S. PATENT DOCUMENTS

| | | | | |
|---|---|---|---|---|
| 4,732,357 A | * | 3/1988 | Lindsay | 248/183.2 |
| 4,955,568 A | * | 9/1990 | O'Connor et al. | 248/183.3 |
| 5,088,676 A | * | 2/1992 | Orchard et al. | 248/421 |
| 5,335,142 A | * | 8/1994 | Anderson | 361/681 |
| 5,469,793 A | * | 11/1995 | Lindsay | 108/2 |
| 5,577,806 A | * | 11/1996 | Ugalde | 297/423.46 |
| 5,605,101 A | * | 2/1997 | Lindsay | 108/7 |
| 5,878,674 A | * | 3/1999 | Allan | 108/93 |
| 6,347,433 B1 | * | 2/2002 | Novin et al. | 16/367 |
| 6,364,275 B1 | * | 4/2002 | Lindsay | 248/648 |
| 6,398,176 B1 | * | 6/2002 | Liu | 248/284.1 |

FOREIGN PATENT DOCUMENTS

| | | |
|---|---|---|
| DE | 37 39 080 | 5/1989 |
| EP | 0 558 597 | 1/1999 |
| GB | 2 049 601 | 12/1980 |
| GB | 2 102 757 | 2/1983 |
| GB | 2 189 042 | 10/1987 |
| WO | WO92/09846 | 6/1992 |

OTHER PUBLICATIONS

PCT International Preliminary Examination Report from International Application No. PCT/GB01/02802, Dated Apr. 8, 2002.

* cited by examiner

MOUNTINGS FOR PAYLOADS

TITLE OF THE INVENTION

BACKGROUND OF THE INVENTION

This invention relates to a mounting for a payload such as a TV or Video camera in which the mounting includes a platform to carry the pay load which is rotatable about a horizontal axis to either side-of a neutral position in which the platform is horizontal and a spring mechanism is provided to resist the tilting movement in either direction from said neutral position to counterbalance the payload-platform in any position of tilt.

Our European patent specification No. 0558597, our UK patent specification No. 2102757, and our UK patent No. 2189042 disclose camera mountings with different mechanisms for counter-balancing the mounting in tilt movement so that the mounting will stay at rest in any position of tilt to which it is moved.

The above arrangements all provide substantially perfect balance throughout their ranges of movement once correctly adjusted but all of the mechanisms are complicated and require considerable space in which to operate.

GB Patent Specification No. 2049601 discloses a torque counterbalancing mechanism for use on tiltable tables, the mechanism comprising a cam engaged by a cam follower on which a linear helical spring acts so that the interaction of the cam and follower produces a force equal and opposite to the torque generated as the tiltable table with load rotates either side of the vertical.

The linear spring of this arrangement takes up considerable space and it is not easy with this arrangement to provide different springs which can be selectively coupled/uncoupled with the cam follower to cater for different loads.

BRIEF SUMMARY OF THE INVENTION

It is therefore an object therefore of this invention to provide a counter balanced camera mounting which is of simple and compact construction whilst preserving substantially perfect balance throughout its range of movement.

This invention provides a mounting for a payload (e.g. a TV/Video camera) comprising a platform providing a mounting face for the payload, means to mount the platform for rotation about a horizontal axis for tilting of the platform to either side of a neutral position in which the platform is horizontal and spring means to provide resistance to the tilting position to counterbalance the payload/platform in any position of tilt, wherein the spring means comprise a torsion spring means and coupling means are provided interconnecting the platform and said spring means with a mechanical advantage which increases automatically with movement of the platform away from said neutral position to compensate for the increasing spring resistance to tilting generated by the torsion spring required to counterbalance the camera/platform combination throughout its range of tilting.

Preferably the torsion spring is arranged with its axis parallel to said horizontal axis about which the platform rotates and the coupling means acts on the tiltable platform at a location spaced from the horizontal axis of rotation of the platform.

By way of example the coupling means may comprise a lever connected to the platform and coupled to the torsion spring means to exert a torque thereon.

More specifically the lever may have a sliding connection to the platform to accommodate the different axes of rotation of the platform and lever whereby tilting of the platform tilts the lever by a corresponding amount to develop a torque in such a torque spring which resists said tilting of the platform.

In any of the above arrangements, the torsional spring means may comprise a helical spring or a flattened spiral spring.

BRIEF DESCRIPTION OF THE SEVERAL VIEWS OF THE DRAWING(S)

The following is a description of some specific embodiments of the invention, reference being made to the accompanying drawings in which.

DETAILED DESCRIPTION OF THE INVENTION

Figure 1:
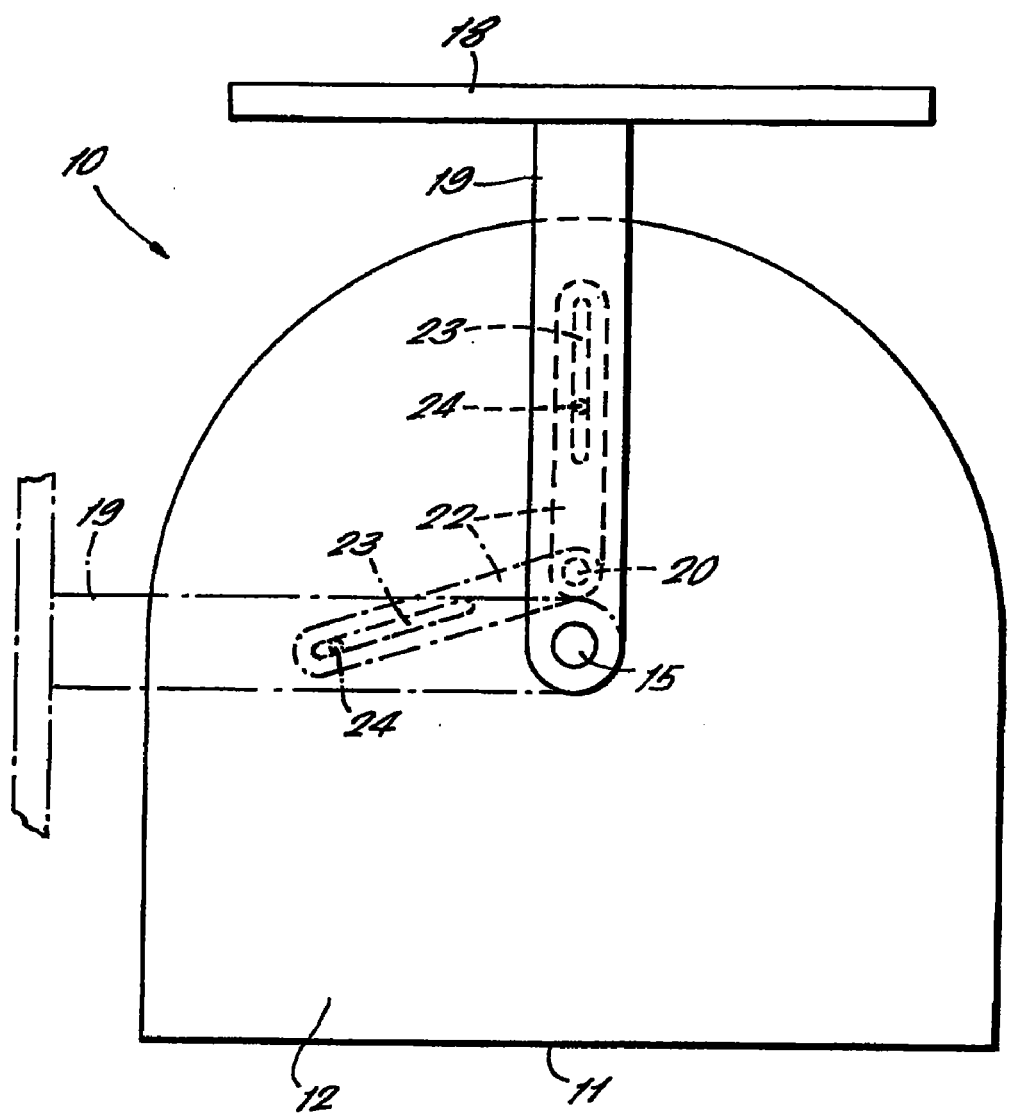
FIG. 1 is a side view of a mounting for a TV/Video camera.
Figure 2:
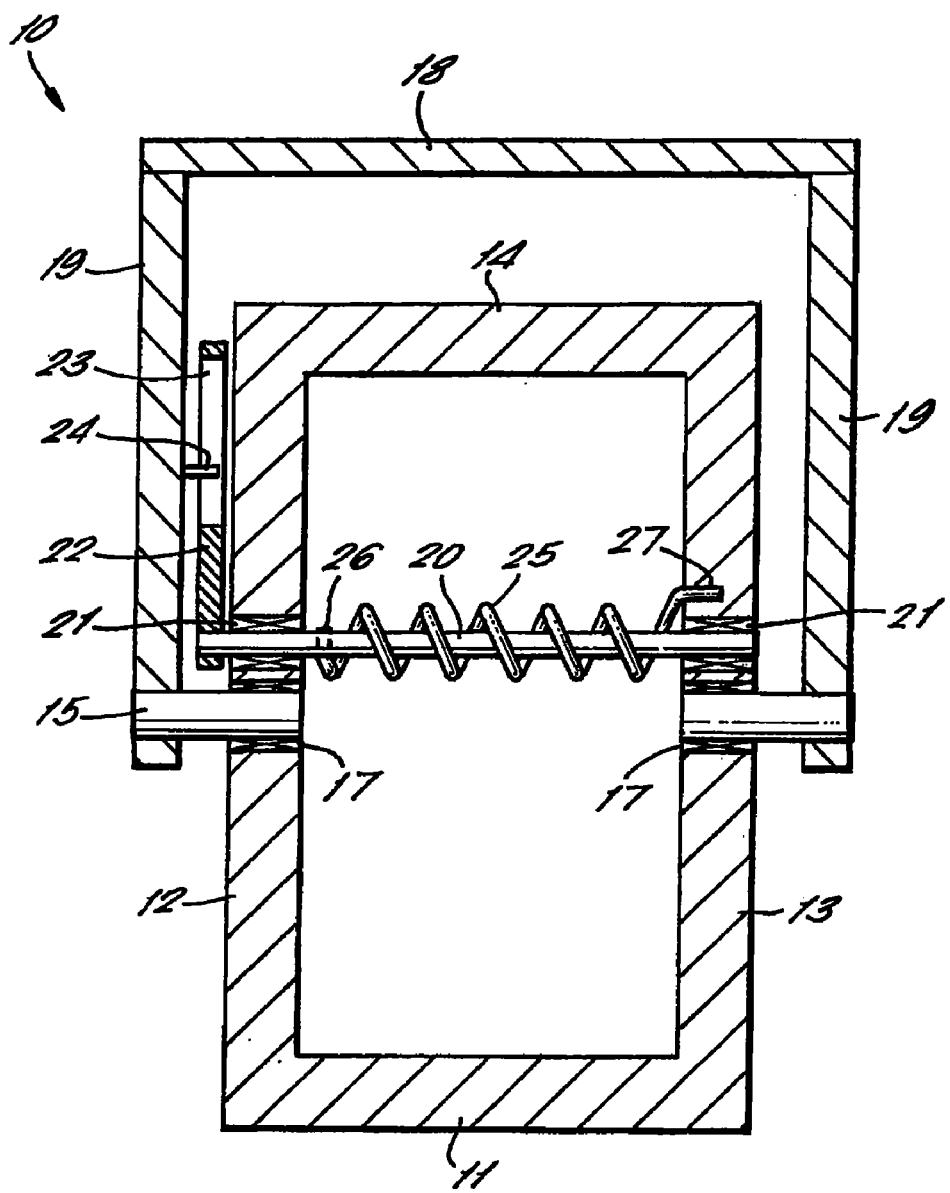
FIG. 2 is a cross sectional view of the mounting shown in FIG. 1.

FIGS. 1 and 2 of the drawings show a tiltable mounting for a TV, video or cinematograph camera comprising a base indicated generally at 10 in the form of an upstanding enclosure, the upper part of which is semi-circular in profile. The enclosure has a bottom wall 11, spaced side walls 12 and 13 and top wall 14.

Stub shafts 15 extend through and are rotatably supported in bearings 17 mounted in the side walls 12,13 for rotation about a horizontal axis.

A standard platform 18 having conventional devices for locating and securing a TV/Video camera to the platform has downwardly dependent spaced apart legs 19 which extend down either side of the enclosure and are secured to the projecting ends of the stub shafts 15 to support the platform for rotation.

A mechanism for counterbalancing tilting movement of the platform from neutral horizontal position will now be described.

It will be appreciated and will be demonstrated by the mathematical analysis to follow later that the torque required to balance the platform over the 90° of movement from the horizontal will rise rapidly at first and then tail off towards the 90° position.

The counter-balancing mechanism provided to achieve this comprises a second shaft 20 rotatably mounted in bearings 21 in the side walls 12,13 of the enclosure vertically above the shaft 15. At one end of the shaft 20 a lever 22 is secured to the shaft to rotate with the shaft. The lever has a slideway 23 extending lengthwise of the lever to which a pin 24 projecting from the adjacent leg 19 engages. Thus, as the platform tilts on shafts 15, engagement of the pin 24 in the slideway will cause the lever 22 to rotate. It will be appreciated that the point of engagement of the pin in the slideway on the lever will vary because of the different axes of rotation, and to accommodate this the pin will slide along the slideway as the leg and lever rotates.

Within the enclosure, a torsion spring 25 encircles the shaft 21 to one end 26 of the spring 25 being anchored to the shaft and the other end 27 being anchored to the enclosure. The torsion spring provides a resistance to "wind up" which increases linearly with rotation of the lever. To compensate for this effect on the platform/leg assembly, the sliding connection of the lever to the leg provides an increasing mechanical advantage which the leg exerts on the spring with tilting of the platform/leg assembly away from the neutral position. In this way the rate of rotation of the arm and therefore the rate of wind up of the torsion spring is arranged to generate a torque in the spring which, at the increasing mechanical advantage acting on the leg matches the increasing out of balance force of the payload/platform 15 to counterbalance fully the platform wherever it is moved to up to 90° on either side of the horizontal.

Figure 3:
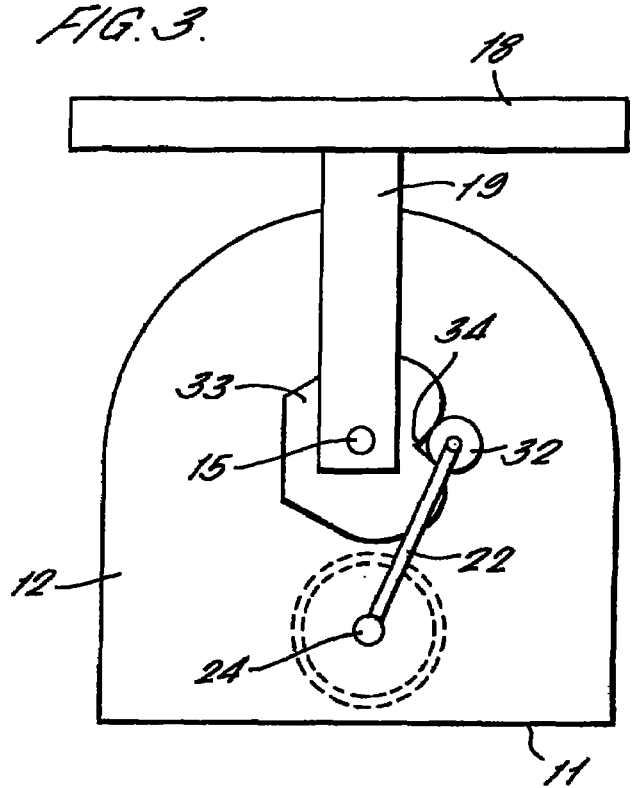
FIG. 3 is a diagrammatic view of an alternative construction with the camera platform shown upright.
Figure 4:
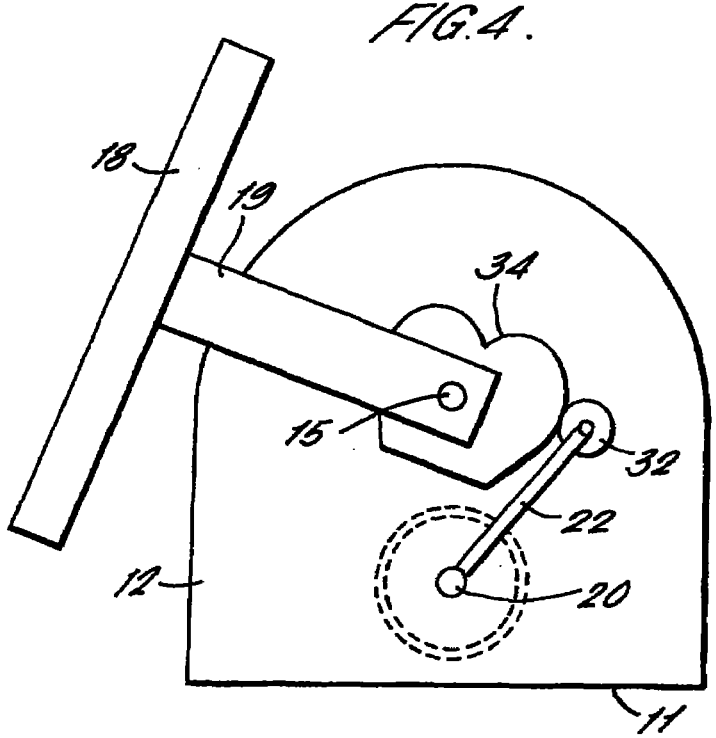
FIG. 4 shows the mounting of FIG. 3 with the platform tilted to one side.
Figure 5:
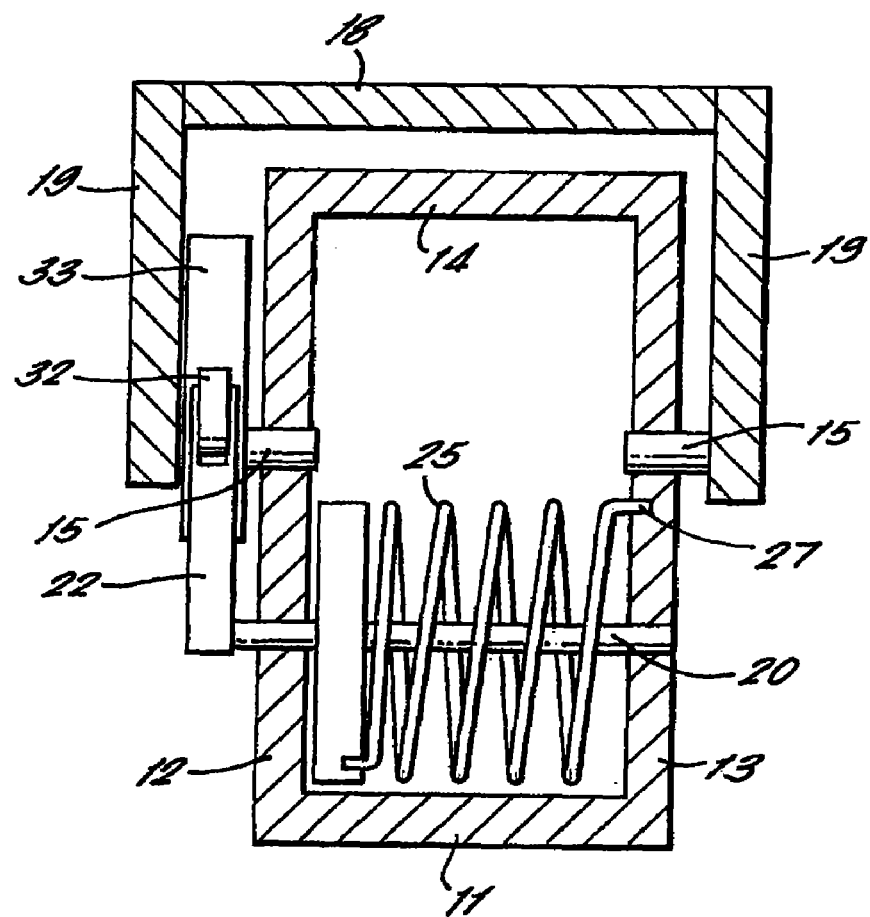
FIG. 5 is an end view of the mounting of FIGS. 3 and 4.

Reference is now made to FIGS. 3 to 5 of the drawings which show a further tiltable mounting for a TV/Video camera having an alternative form of counterbalancing mechanism in accordance with the invention. Many of the features of the mounting are the same as those of the embodiment shown in FIGS. 1 and 2 and like parts have been given the same reference numerals. In the embodiment of FIGS. 3 to 5, the second shaft 20 on which the torsion spring 25 acts is mounted vertically below the shaft 15 being supported in bearings in the sidewalls 12 and 13 of the enclosure. In this case, one end of the torsion spring is anchored in sidewall 13 of the enclosure and the other end of the torsion spring is anchored in an arm 30 fixed to the shaft 20. One end of the shaft 20 projects through the sidewall 12 of the enclosure and a lever is secured at one end to the projecting end of the shaft. The other end of the lever carries a roller 32 to act as a cam follower.

Shaft 15 on which the camera mounting is pivoted has a heart-shaped cam 33 fixed to the shaft to be engaged by the cam follower 32. The heart-shaped cam 33 is oriented on the shaft 15 so that when the camera mounting platform 18 is horizontal, the top of the heart faces laterally of the shaft 15 and the cusp form 34 at the top of the heart is engaged by the follower wheel 32. The heart-shaped cam is designed to provide a connection of varying mechanical advantage between the tilting platform and torsion spring, such that as the platform tilts from the neutral position, so the mechanical advantage increases to compensate for the increasing resistance to rotation offered by the torsion spring. By suitably shaping the heart-shaped cam, the force required to counterbalance the platform throughout its range of tilting movement is provided by the windup of the torsion spring through displacement of the cam follower, in a similar manner to that described in connection with FIGS. 1 and 2 above.

It will be observed that the heart-shaped cam is symmetrical about a line extending through the cusp 34 of the cam and the shaft 15 on which the cam is supported, so that a similar counterbalancing force is developed in the torsion spring per degree of angular rotation of the platform to either side of the upright neutral position.

In a further construction which is not illustrated the connections between the platform and torsion spring are replaced by non-circular gears between the stub-shaft 15 rotating with the platform and shaft 20 acting on the spring to provide a drive of increasing mechanical advantage with rotation of the platform from the neutral position to generate the requisite compensation factor as described earlier.

The following is a mathematical analysis of the applicable forces and demonstrates how near perfect balance is achieved throughout the greater part of the range of tilt of the platform for the mechanism described above.

Figure 6:
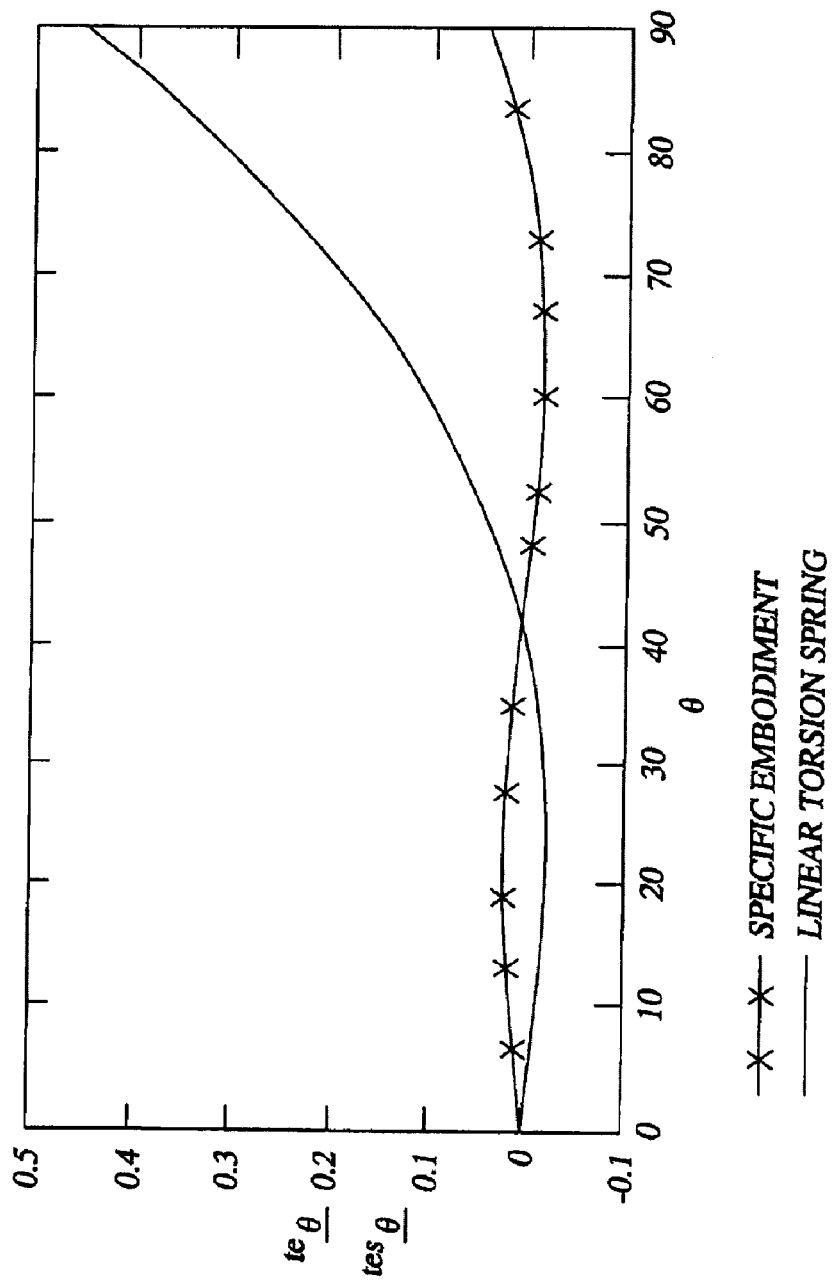
FIG. 6 is a graph illustrating Torgue Error vs. Tilt Angle.

FIG. 6 is a graph illustrating Torque Error (Specific Embodiment/Linear Torsion Spring) vs. Tilt Angle.

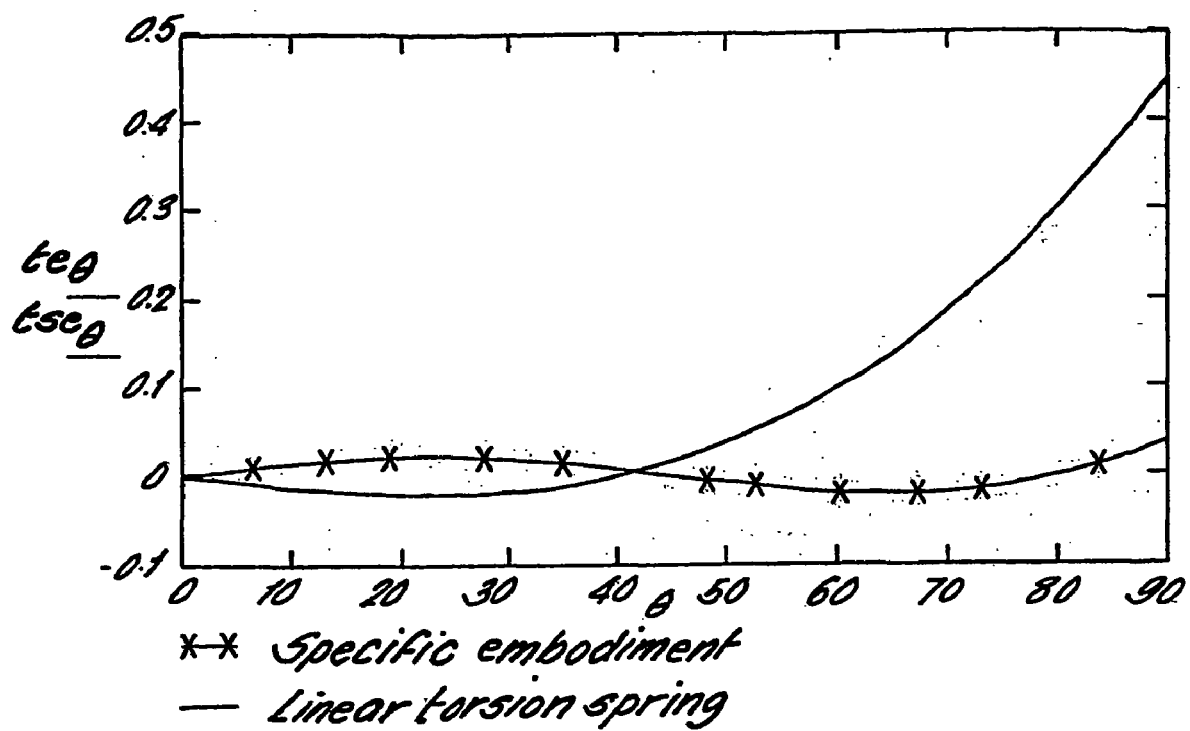

As can be seen from the graphs, near perfect balance is achieved in the specific embodiment over the range 0-90°. In fact perfect balance is achieved at 0°, 45° and 90° with slight divergence from perfect balance in the region of 20° and 70°. This very slight out of balance is significantly less than the general "stiction" in the system and so is of no consequence. For all practical purposes this is perfectly acceptable to the user.

the levers with platform tilt to provide a varying mechanical advantage between the levers whereby the payload/platform is fully counterbalanced throughout its range of tilt by the spring.

5. The mounting as claimed in claim 4, wherein the sliding connection between the driving lever and the driven lever accommodates the different axes of rotation of the levers whereby tilting of the platform driving lever tilts the

| Camera Mass: m | C of G Height: r | Tilt Angle: | Spring Disp: | Spring Rate: k |
|---|---|---|---|---|
| $r1 := 30$ | $d := 7.6$ | $m := 1\ r := 1$ | $\theta bal := 45$ | $\theta bal\ s := 40$ |
| Crank throw | Spring lever offset | Mass & CG of payload | Perfect balance angle | Perfect balance angle (linear) |
| $\theta b := \theta bal \cdot deg$ | $\theta bs := \theta bals \cdot deg$ | | $yb := r1 \cdot \cos(\theta b) - d$ | $r2b := \sqrt{(xb)^2 + (yb)^2}$ |
| $\theta 1b := \operatorname{acos}\left(\dfrac{yb}{r2b}\right)$ | $k := m \cdot r \cdot \sin(\theta b) \cdot \dfrac{r2b}{r1 \cdot \theta 1b \cdot \cos(\theta 1b - \theta b)}$ | | $\theta := 0, 3 \ldots 90$ | $\theta r_\theta := \theta \cdot \theta deg$ Tilt angle (rads) |
| Spring disp (perfect balance) | | | | |
| $y_\theta := r1 \cdot \cos(\theta r_\theta) - d$ | $x_\theta := r1 \cdot \sin(\theta r_\theta)$ | | $r2_\theta := \sqrt{(x_\theta)^2 + (y_\theta)^2}$ | |
| $\theta 1_\theta := \operatorname{acos}\left(\dfrac{y_\theta}{r2_\theta}\right)$ | $tr_\theta := m \cdot r \cdot \sin(\theta r_\theta)$ Required torque | | $ta_\theta := \dfrac{k \cdot \theta 1_\theta \cdot r1 \cdot \cos(\theta 1_\theta - \theta r_\theta)}{r2_\theta}$ | $te_\theta := ta_\theta - tr_\theta$ Torque error |
| Spring disp (actual) | | | Actual torque | |
| $ts_\theta := m \cdot r \cdot \sin(\theta bs) \cdot \dfrac{\theta r_\theta}{\theta bs}$ | $tse_\theta := ts_\theta - tr_\theta$ Torque error (linear) | | | |
| Torque (linear) | | | | |

The invention claimed is:

1. A mounting for a payload comprising:
   a platform providing a mounting face for the payload,
   a means to mount the platform for rotation about a horizontal axis for tilting of the platform to either side of a neutral position in which the platform is horizontal,
   a torsion spring means to provide resistance to the said tilting movement in either direction from said neutral position to counterbalance the payload/platform in any position of tilt, and
   a coupling means constructed and arranged to connect the platform to the torsion spring means to provide a zero force acting on the platform in the neutral position and a progressively increasing resistance to tilt to either side of the neutral position, the coupling means being configured to provide a mechanical advantage which varies with rotation of the platform about said horizontal axis from the neutral position to compensate for the spring characteristics, whereby the spring substantially exactly counterbalances the platform and payload throughout its range of tilt.

2. The mounting as claimed in claim 1, wherein the torsion spring means comprise a helical spring or a flattened spiral spring.

3. The mounting as claimed in claim 1, wherein the torsion spring is arranged with its axis parallel to said horizontal axis about which the platform rotates.

4. The mounting as claimed in claim 3, wherein the coupling means comprises a driving lever associated with the platform and a driven lever associated with the spring means, the driving lever interacting with the driven lever such that tilting of the platform is resisted by the spring, wherein a slidable connection between the driving lever and the driven lever provides a varying effective length of one of the levers with platform tilt to provide a varying mechanical advantage between the levers whereby the payload/platform is fully counterbalanced throughout its range of tilt by the spring.

5. The mounting as claimed in claim 4, wherein the sliding connection between the driving lever and the driven lever accommodates the different axes of rotation of the levers whereby tilting of the platform driving lever tilts the driven lever by a corresponding amount to develop a torque in said torsion spring which resists said tilting of the platform driving lever and thereby counterbalancing the platform.

6. The mounting as claimed in 4, wherein the driving lever comprises a cam means acting between the platform and the torsion spring means.

7. The mounting as claimed in claim 6, wherein the cam means comprises a cam mounted to rotate with the platform about said horizontal axis on which the platform is tiltable and a cam follower located on said driven lever acts on the cam and the driven lever is connected to the torsion spring means to rotate about said parallel axis.

8. The mounting as claimed in claim 7, wherein said driven lever which is coupled to the torsion spring means has the cam follower located on the driven lever to engage the cam.

9. The mounting as claimed in claim 8, wherein the cam is heart-shaped and the cam follower is a roller to engage the periphery of the cam.

10. A mounting for a payload comprising a platform providing a mounting face for the payload, a means to mount the platform for rotation about a horizontal axis for tilting of the platform to either side of a neutral position in which the platform is horizontal, a torsion spring means to provide resistance to the said tilting movement in either direction from said neutral position to counterbalance the payload/platform in any position of tilt and a coupling means interconnecting the platform and said spring means, the coupling means provides a mechanical advantage which increases automatically with movement of the platform away from said neutral position to compensate for the increasing spring resistance to tilting generated by the torsion spring to counterbalance the payload/platform combination through its range of tilting; wherein the improvement comprises arranging the torsion spring with its axis parallel to said horizontal axis about which the platform rotates and the coupling means comprising a cam associated with the platform to rotate with the platform and a rotatable driven lever having a cam follower acting on the cam such that tilting of the platform rotates the cam to stress the spring means and thereby provide a resistance to rotation of the platform, the cam being shaped to provide a varying mechanical advantage with tilting of the platform so that the platform and payload on the platform is fully counterbalanced throughout its range of tilt by the spring.

11. The mounting as claimed in claim 10, wherein the cam is heart shaped and the cam follower on the lever is a roller which engages the periphery of the heart shaped cam.

12. The mounting as claimed in claim 11, wherein the torsion spring means comprises a helical spring or flattened spiral spring.

13. A mounting for a payload comprising a platform providing a mounting face for the payload, a means to mount the platform for rotation about a first horizontal axis for tilting of the platform to either side of a neutral position in which the platform is horizontal, a torsion spring means to provide resistance to the said tilting movement in either direction from said neutral position to counterbalance the payload/platform in any position of tilt and a coupling means interconnecting the platform and said spring means, the coupling means providing a mechanical advantage which increases automatically with movement of the platform away from said neutral position to compensate for the increasing spring resistance to tilting generated by the torsion spring to counterbalance the payload/platform combination through its range of tilting; wherein the platform is located on a driving lever pivotally mounted about said horizontal axis and the coupling means comprises a driven lever pivotally mounted about a second horizontal axis parallel to the first axis, the torsion spring acting on the driven lever and a sliding connection between the driving and driven levers such that tilting of the platform is resisted by the torsion spring, and said sliding connection provides a varying effective length of one of the levers with platform tilt to provide a varying mechanical advantage between the levers whereby the payload/platform is fully substantially exactly counterbalanced throughout its range of tilt to either side of the neutral position.

14. The mounting as claimed in claim 13, wherein the driving and driven levers are aligned when the platform is in the neutral position and move progressively out of alignment with tilting of the platform/driving lever about said horizontal axis and corresponding rotation of the driven lever through the connection about said parallel axis, rotation of the driven lever being resisted by said spring means such that the tilting of the platform/driving lever is counterbalanced throughout its range of tilt.

15. The mounting as claimed in claim 13, wherein the sliding connection between the driving and driven levers comprises a slide fixed on the driving lever and a slideway extending lengthwise on the driven lever in which the slide on the driving lever engages.

16. A mounting for a payload comprising a platform providing a mounting face for the payload, a means to mount the platform for rotation about a horizontal axis for tilting of the platform to either side of a neutral position in which the platform is horizontal, a torsion spring means to provide resistance to the said tilting movement in either direction from said neutral position to counterbalance the payload/platform in any position of tilt and a coupling means interconnecting the platform and said spring means, the coupling means provides with a mechanical advantage which increases automatically with movement of the platform away from said neutral position to compensate for the increasing spring resistance to tilting generated by the torsion spring to counterbalance the camera/platform payload/platform combination through its range of tilting; wherein the improvement comprises arranging the torsion spring with its axis parallel to said horizontal axis about which the platform rotates and arranging the coupling means to act on the tiltable platform at a location spaced from the horizontal axis of rotation of the platform comprises a driving lever associated with the platform and a driven lever associated with the spring means, the driving lever interacting with the driven lever such that tilting of the platform is resisted by the spring, wherein a slidable connection between the driving lever and the driven lever provides a varying effective length of one of the levers with platform tilt to provide a varying mechanical advantage between the levers whereby the payload/platform is fully counterbalanced throughout its range of tilt by the spring wherein the torsion spring means comprise a helical spring or a flattened spiral spring.

* * * * *